United States Patent [19]
Yamazaki

[11] Patent Number: 4,782,923
[45] Date of Patent: Nov. 8, 1988

[54] AUTOMATIC GAP REGULATOR FOR DRUM BRAKE

[75] Inventor: Kimihiro Yamazaki, Saitama, Japan

[73] Assignee: Akebono Brake Industry Co., Ltd., Tokyo, Japan

[21] Appl. No.: 11,873

[22] Filed: Feb. 6, 1987

[30] Foreign Application Priority Data

Feb. 12, 1986 [JP] Japan ............... 61-17561[U]

[51] Int. Cl.⁴ ............................. F16D 55/58
[52] U.S. Cl. ..................... 188/79.64; 188/196 B
[58] Field of Search ........... 188/106 A, 196 B, 79.51, 188/79.52, 79.53, 79.54, 79.62, 79.64

[56] References Cited

U.S. PATENT DOCUMENTS 3,874,481  4/1975  Margetts ............... 188/79.5 GT
4,589,527  5/1986  Danny et al. ........... 188/79.5 GE

FOREIGN PATENT DOCUMENTS 2246501  4/1973  Fed. Rep. of Germany ..... 188/79.5 GE
2606925  9/1976  Fed. Rep. of Germany ..... 188/79.5 GE
2932340  3/1981  Fed. Rep. of Germany ..... 188/79.5 GT
 126127  7/1984  Japan ..................... 188/79.5 GE
2133846  8/1984  United Kingdom ........... 188/196 B Primary Examiner—George E. A. Halvosa
Attorney, Agent, or Firm—Cushman, Darby & Cushman

[57] ABSTRACT

A strut type automatic gap regulator for a drum brake in which a pair of brake shoes are mounted opposite each other and adapted to be moved apart in a braking action. Toothed portions of a strut engage similar toothed portions of a latch which engages a shoe for linear movement therewith. A first spring extends between the one shoe and the latch to urge the toothed portions together while a second spring extends between the strut and one shoe to bias the strut in a direction to extend its effective length.

2 Claims, 2 Drawing Sheets

AUTOMATIC GAP REGULATOR FOR DRUM BRAKE

BACKGROUND AND SUMMARY OF THE INVENTION

This invention relates to a strut type automatic gap regulator for a drum brake.

A known automatic gap regulator as disclosed in U.S. Pat. No. 3,874,481 is shown in FIG. 3. More specifically, a platelike strut 103 is provided between a pair of conventional brake shoes 101 and 102 arranged opposite to each other and fitted to a backing plate 100. A cam member 105 is coupled to one end of the strut 103 through a leaf spring 104, the cam member 105 being provided with a toothed portion 105a for engaging a gear member 106 fixed to the strut 103. A projection 105b extends into a through-hole 101a formed in the web of one brake shoe 101 with a gap $\delta_o$ therebetween. The other end of the strut 103 is mated with the web of the other brake shoe 102 through a rocking parking lever 108 coupled thereto by a pin 107. A coil extension spring 109 biases the strut 103 toward the other brake shoe 102.

During the normal operation of the brake, hydraulic oil is introduced from an external hydraulic oil source into a wheel cylinder (not shown) to expand both the brake shoes 101 and 102. The strut 103, together with the brake shoe 102, is then moved to the left on the drawing by the action of the coil extension spring 109, if the shoe gap exceeds the normal shoe gap because of the wear of the linings, to fill up the gap $\delta_o$ between the projection 105b of the cam member 105 and the through-hole 101a. Then the cam member 105 is dragged by the brake shoe 101 to the right relative to the diagram and the toothed portion 105a disengages from the gear member 106. In consequence, the cam member 105 is slightly revolved clockwise around the fulcrum $O_o$, and the projection 105b is thereby tilted to the right and caused to engage with the gear member 106 with one tooth in the toothed portion advanced. The shoe gap is thus automatically regulated.

The gap $\delta_o$ between the projection 105b fitted to the cam member 105 and the through-hole formed in the web of the brake shoe is the ordinary shoe gap and, since the strut 103 is practically extended by revolving the cam member 105, the gap $\delta_o$ tends to be unstable as cam member 105 revolves. Moreover, the transmission of thrust to the brake shoes through the strut 103 is not linear. Therefore, the size of the strut 103 and the cam member 105 must be increased.

These problems are overcome according to the present invention in which toothed portions of a strut engage similar toothed portions of a latch which engages a shoe for linear movement therewith. A first spring extends between the one shoe and the latch to urge the toothed portions together while a second spring extends between the strut and the one shoe to bias the strut in a direction to extend its effective length.

More particularly, a pair of brake shoes are mounted opposite to each other and fitted to a backing plate with a wheel cylinder held between one pair of ends of the brake shoes, the other pair of ends being supported with an anchor. The strut has a fulcrum at one end and a toothed portion at the other, the fulcrum abutting against the web of one brake shoe to hold the web. The strut is biased for rotation by a first spring extending from the strut to the one brake shoe to make the strut extend its effective length. The web of the other brake shoe fits into a guide groove formed in a latch also having a projection inserted into a through-hole bored in the web to provide the gap between the projection and the through-hole. A second spring extends from the latch to the one brake shoe to engage the toothed portion of the latch and that of the strut in a normal state.

If introduction of hydraulic oil from an external hydraulic oil source into the wheel cylinder to actuate the brake for normal use causes the shoe gap to become greater than the shoe gap for normal use because of the wear of the linings of the brake shoes, the brake shoes expand the space between the respective ends thereof. The other brake shoe works to fill up the gap between the through-hole and the projection of the latch and moves with the latch, whereas the one brake shoe moves with the strut. When the toothed portion of the latch is disengaged from that of the strut, the strut is revolved by the coil extension spring stretched to the one brake shoe in such a direction as to extend its effective length. When the brake is then released both the brake shoes revert to the original positions.

The latch is thereby drawn by the coil extension spring stretched over the one brake shoe and changes its position of engagement with the strut and engages therewith again after extending the effective length of the strut to secure the predetermined gap $\delta_o$ between the projection of the latch and the through-hole of the other brake shoe. The shoe gap is thus automatically regulated.

DETAILED DESCRIPTION OF THE PREFERRED EMBODIMENT

Figure 1:
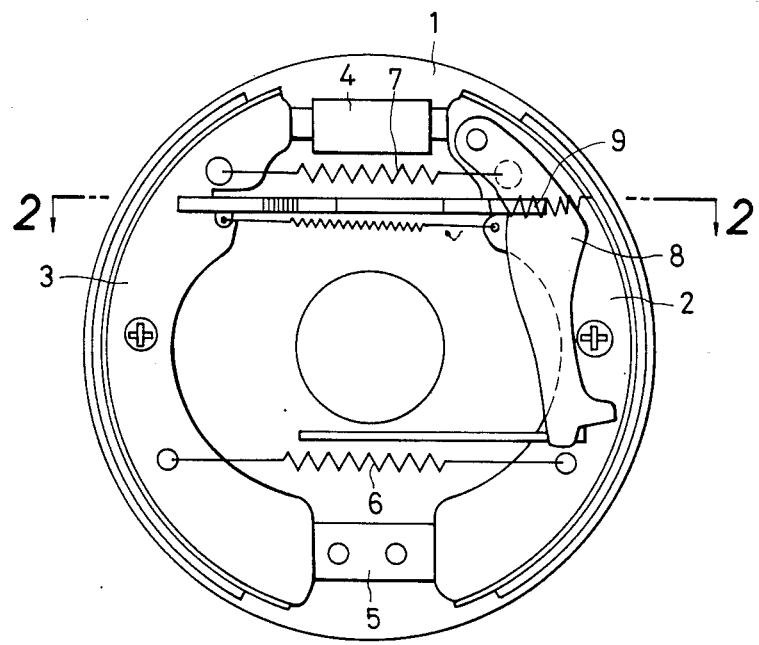
FIG. 1 is a top view of a leading/trailing shoe drum brake equipped with a strut type automatic gap regulator embodying the present invention.

Referring now to the accompanying drawings, an embodiment of the present invention will be described. The regulator includes brake shoes 2 and 3 arranged opposite to each other and fitted to a backing plate 1. One pair of ends of both brake shoes 2 and 3 holds a double-acting wheel cylinder 4 therebetween, the other pair of ends being supported with an anchor 5 fixed to the backing plate 1. The gap regulator further includes shoe return springs 6 and 7 and a parking lever 8.

Figure 2:
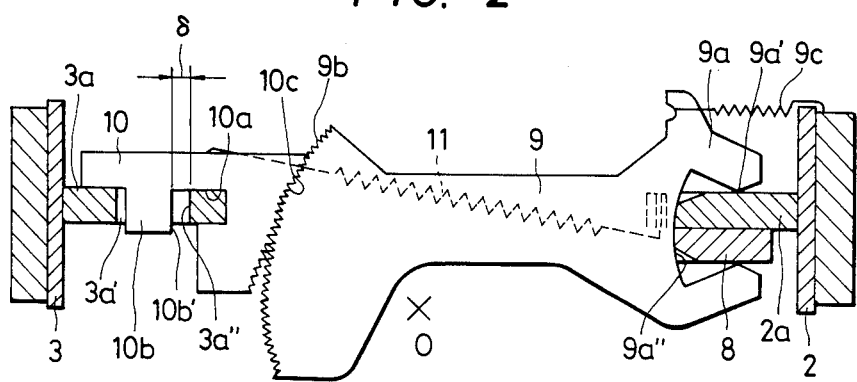
FIG. 2 is a sectional view taken on line 2—2 of FIG. 1 excluding the backing plate.
Figure 3:
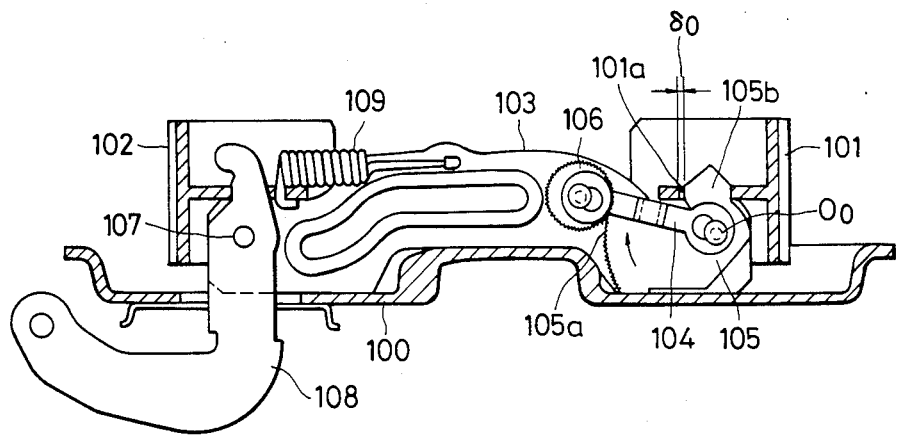
FIG. 3 is a diagram showing a conventional strut type automatic gap regulator.

As shown in FIG. 2, a platelike strut 9 is provided with a bifurcated catch 9a at one end for receiving web 2a of the brake shoe and the parking lever 8, the bifurcated catch 9a abutting against the side of the web 2a at an inwardly projected fulcrum 9a' formed on the catch 9a. An arcuate portion with its center O offsetting the fulcrum 9a' is provided at the other end of the strut 9 in the form of a toothed portion 9b. The strut 9 is biased clockwise in FIG. 2 by a coil extension spring 9c stretched from the brake shoe 2 and biased to extend its effective length. The contact area of the inner peripheral face 9a'' of the catch 9a and the web 2a or parking lever 8 should preferably be minimized to reduce the revolving resistance of the strut 9.

The gap regulator further includes a platelike latch 10 having a guide groove 10a for guiding the inner end of the web 3a of the other brake shoe and a projection 10b perpendicularly intersecting the guide groove 10a. The inner end of the web 3a of the brake shoe is fitted, with slight looseness, into the guide groove 10a, whereas the projection 10b is inserted in the through-hole 3a'. The gap δ between the inner side 10b' of the projection and the inner side 3a" of the throughhole 3a' is the shoe gap for normal use. A toothed portion 10c for engaging with the toothed portion 9b of the strut is formed on one side of the latch 10. The latch 10 is biased toward the strut 9 by stretching a coil extension spring 11 from the latch 10 to the web 2a of the brake shoe 2, so that the toothed portions 10c and 9b are normally engaged.

Initially regulating the shoe gap, i.e., adjusting the shoe gap given between both the brake shoes 2, 3 and the inner peripheral face of a brake drum to a shoe gap for normal use is carried out by actuating the brake for normal use one time (one-shot adjustment). In other words, by introducing hydraulic oil from an external hydraulic oil source to the wheel cylinder 4 to expand both the brake shoes 2 and 3, the other brake shoe 3 is caused to move with the latch 10 while filling up the gap δ. Brake shoe 2, on the other hand, is caused to move with the strut 9, whereby the toothed portion 10c of the latch and that 9b of the strut are disengaged. Since the strut 9 has been biased by the extension spring 9c to extend its effective length, the strut 9 extends to allow the toothed portion 9b to reengage the toothed portion 10c of the latch in a new position. When the brake is released, both the brake shoes 2 and 3 are retracted by the action of the return springs 6 and 7 to secure the gap δ between the projection of the latch and the inside 3a" of the through-hole of the web of the other brake shoe. The shoe gap for normal use is thus obtained.

If the shoe gap exceeds the one for normal use because of the wear of the linings of the brake shoes 2 and 3, the strut 9 revolves around the fulcrum 9a' as described above and, by feeding the teeth one after the other in the toothed portions 9b and 10c engaging each other, adjust the shoe gap automatically.

When the present invention is applied to a brake without the parking lever 8, the bifurcated catch may be used to hold only the web 2a of a brake shoe.

As is obvious from the aforesaid description, the strut type automatic gap regulator according to the present invention allows the gap between the projection of the latch for providing the shoe gap for normal use and the through-hole of the web of the brake shoe to be kept constant at all times and the transmission of thrust from the parking lever to the other brake shoe through the strut to be made linearly, so that the strut may be made relatively compact.

What the claim is:

1. A strut type automatic gap regulator for a drum brake comprising:
   a pair of brake shoes mounted opposite to each other and adapted to be moved linearly apart in a braking action, each shoe having a web;
   a platelike strut having a fulcrum at one end engaging the web of one shoe and a toothed portion at the other end;
   a platelike latch having a linearly extending guide groove defined therein for guiding the web of the other shoe for only linear movement with respect thereto and having a toothed portion for engaging the toothed portion of said strut, said strut and said latch being in substantially one plane;
   a first spring means extending between said latch and said one shoe for urging said toothed portions into engagement; and
   a second spring means extending between said strut and said one shoe for biasing said strut toward rotation in a direciton to extend its effective length, wherein a gap δ is defined between said latch and the other braking shoe in the guide groove so as to act as a braking clearance.

2. A strut type automatic gap regulator for a drum brake, comprising:
   a backing plate;
   a pair of brake shoes mounted opposite to each other each having a web and fitted to said backing plate;
   a wheel cylinder being held between one pair of ends of the brake shoes;
   an anchor supporting the other pair of ends of said shoes;
   a platelike strut including a bifurcated catch with a fulcrum at one end and a toothed portion at the other, causing the fulcrum to abut against said web of one brake shoe to hold said web across the bifurcated catch;
   a first spring extending from the strut to the one brake shoe;
   a platelike latch having a linearly extending guide groove for receiving the web of the other brake shoe and having a projection adjacent said guide groove and a toothed portion formed in its end surface, said projection being inserted in a through-hole bored in the web of the other brake shoe to define a gap δ in the groove between the projection and the web, so that said latch is constrained to move only linearly with respect to the other brake shoe; and
   a second spring extending from said latch to said one brake shoe to engage said toothed portions of said strut and the latch, said strut and said latch being in one plane.

* * * * *